(12) United States Patent
Whikehart

(10) Patent No.: US 6,295,324 B1
(45) Date of Patent: Sep. 25, 2001

(54) SIGNAL QUALITY MEASUREMENT USING FULL-COMPLEX FM DETECTOR

(75) Inventor: J. William Whikehart, Novi, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 08/988,249

(22) Filed: Dec. 10, 1997

(51) Int. Cl.[7] .................................................. H03D 3/18
(52) U.S. Cl. .............................................. 375/308; 375/324
(58) Field of Search ........................... 375/324, 325, 375/340, 316

(56) References Cited

U.S. PATENT DOCUMENTS

| | | |
|---|---|---|
| 4,530,076 | 7/1985 | Dwyer . |
| 5,023,940 | 6/1991 | Johnson et al. . |
| 5,113,446 | 5/1992 | Kennedy . |
| 5,155,862 | 10/1992 | Hansen . |
| 5,251,218 | 10/1993 | Stone et al. . |
| 5,477,199 | 12/1995 | Montreuil . |
| 5,663,773 | 9/1997 | Goeckler . |
| 5,818,543 | * 10/1998 | Lee ........................................ 348/725 |

OTHER PUBLICATIONS

TERNIG, Blind Adaptive Equalization of VHF/FM signals by Symmetry Tuning, Electrotechnical Review, 1994, 226–231, 61(4), Ljubljana, Slovenija.

* cited by examiner

*Primary Examiner*—Chi Pham
*Assistant Examiner*—Kevin M Burd
(74) *Attorney, Agent, or Firm*—Larry I. Shelton

(57) ABSTRACT

A signal quality indicator for frequency modulated or phase modulated communication signals is obtained using a full-complex detector. The noise detector looks at the actual signal of interest and not other outside indicators such as high frequency content. Signal quality is measured accurately and efficiently. The resulting measure is used to control subsequent processing such as stereo blend, noise blanking, diversity antenna switching, and others in an FM radio receiver.

12 Claims, 2 Drawing Sheets

SIGNAL QUALITY MEASUREMENT USING FULL-COMPLEX FM DETECTOR

BACKGROUND OF THE INVENTION

The present invention relates in general to detecting received signal quality in a communications receiver, and more specifically to full-complex FM detection in an FM receiver to obtain a quality indicator signal as a measure of noise present in a received FM broadcast signal.

It is well known that in all forms of electronic wire or wireless communications, many types of noise are inadvertently added to a signal when it is transmitted through a transmission channel. Efforts are usually made at the receiving end to detect the presence of excessive additive noise and to take corrective actions or to modify signal reception characteristics as necessary to reduce the impact of the noise.

In an FM radio broadcast system, for example, background emissions, multipath reflections, and off-channel FM broadcasts can all cause noise in a particular FM channel. It is known to detect noisy conditions in an FM channel by measuring high frequency noise energy in the demodulated signal. Based on this measurement, corrective actions are then taken such as reducing stereo separation (i.e., increasing blend) toward monophonic reproduction. This reduces the noise impact because the higher frequency stereo information is more strongly affected by noise. Other corrective actions include narrowing the receiver bandwidth to remove proportionally more noise than original signal, or switching to another antenna in a diversity system which includes spaced antennas.

Examining higher frequencies above the main audio range of a received broadcast signal gives an indication of when noise can be expected to be present at lower frequencies which affects reproduction of the FM signal. However, high frequency noise energy can be an imperfect indicator of noise in the audio range for certain types of noise (either under-estimating or over-estimating the lower frequency noise affecting the FM signal). Thus, a method for detecting noise in the actual frequency range of interest is desirable.

SUMMARY OF THE INVENTION

The present invention has the advantages of providing greater accuracy in noise detection while using only a minimal amount of additional signal processing to detect noise.

In one aspect, the present invention provides a method of determining signal quality comprising the steps of obtaining a complex modulated signal including a in-phase modulated signal and a quadrature-phase modulated signal, and demodulating the in-phase modulated signal and the quadrature-phase modulated signal using a full-complex detector to generate an in-phase demodulated signal and a quadrature-phase demodulated signal. The in-phase demodulated signal consists primarily of noise, the power level of which is a measure of noise in the quadrature-phase demodulated signal.

DETAILED DESCRIPTION OF PREFERRED EMBODIMENTS

Figure 1:
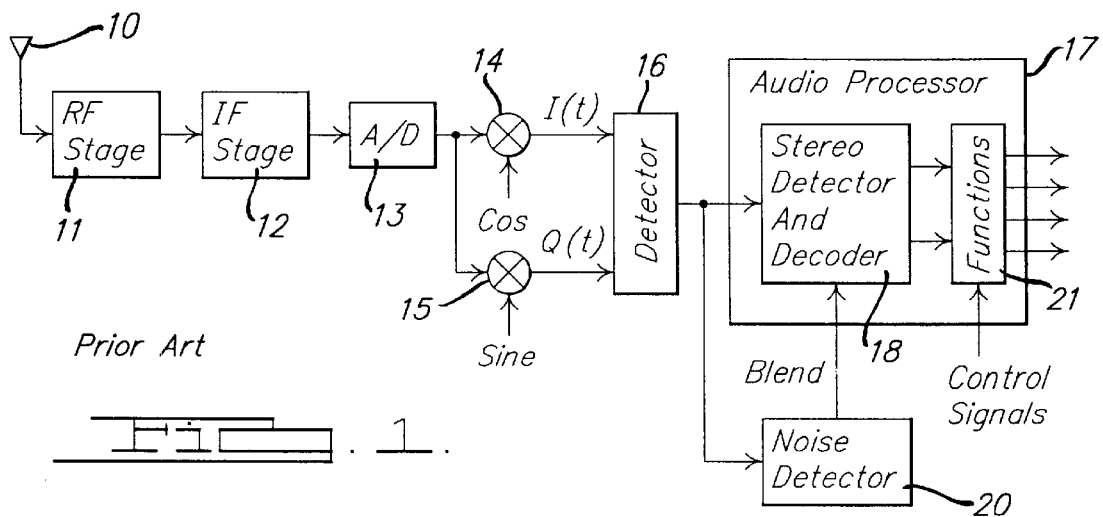
FIG. 1 is a block diagram showing a prior art digital signal processing (DSP) FM radio receiver.

A typical configuration for a digital processing FM radio receiver is shown in FIG. 1. A radio reception antenna 10 is connected to a radio-frequency (RF) input stage 11. Radio waves from antenna 10 are selected (i.e., translated and filtered) by RF stage 11 and coupled to an intermediate-frequency (IF) stage 12 which converts a desired FM broadcast signal within the RF output to a predetermined IF frequency (e.g., 10.7 MHz) and provides the IF signal to an analog-to-digital converter (A/D) 13. The digitized IF signal is coupled to a digital processing section including mixers 14 and 15. As is known in the art, the IF signal is converted to a complex representation in mixers 14 and 15 using quadrature injection signals (cosine and sine) to produce an in-phase component I(t) and a quadrature-phase component Q(t). The I and Q components are coupled to a detector 16 which demodulates the FM signal and provides at its output the FM multiplex (MPX) signal including a L+R signal at baseband and a L-R signal modulated at 38 kHz. The FM MPX signal is coupled to an audio processor 17 which includes a stereo detector and decoder 18. The FM MPX signal is also coupled to a noise detector 20 which, in the prior art, measures high frequency signal content to detect noise. Noise detector 20 controls the amount of stereo blend in proportion to the noise level it detects by varying a blend control signal that is provided to stereo detector and decoder 18. Stereo left and right audio outputs are provided from stereo detector and decoder 18 to a function block 21 which further processes various parameters of the audio signals in response to user control signals for varying tone, balance, fade, and audio bandwidth or equalization, for example. Function block 21 provides four channels of audio output for conversion back to analog signals for amplification and then reproduction by loudspeakers.

Complex representation of the digital IF signal allows very efficient demodulation within detector 16. Detector 16 is referred to herein as a half-complex detector since it has two inputs (the in-phase and quadrature-phase parts of a complex representation), and provides only a single output (the demodulated FM signal).

Figure 2:
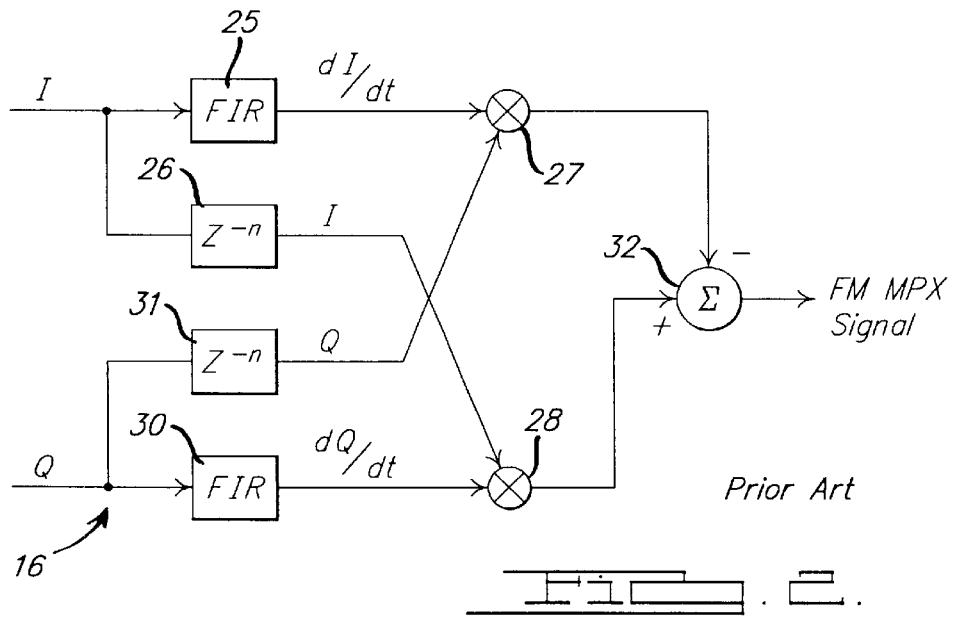
FIG. 2 is a block diagram showing a complex processing method to derive a demodulated FM multiplex signal.

A preferred manner of demodulating the complex IF signal is shown in FIG. 2. The in-phase component I is provided to the input of a finite impulse response (FIR) filter 25 and to the input of a delay block 26. FIR filter 25 is a multi-tap filter having a conventional configuration that provides differentiation of the input signal. A differentiated output dI/dt is provided to the input of a multiplier 27. The differentiation process requires a predetermined number of sample periods, n. Delay block 26 provides an equivalent time delay of n sample periods to provide a time delayed I signal to stay in time alignment with the differentiated signal. The time delayed I signal is provided to one input of a multiplier 28.

The Q signal component is provided to one input of a differentiating FIR filter 30 and to the input of a time delay block 31. The differentiated Q component dQ/dt is provided to a second input of multiplier 28 and the delayed Q signal is provided to a second input of multiplier 27. Filter 30 and delay block 31 are identical to filter 25 and delay block 26, respectively. The output of multiplier 27 is connected to an inverting input of a summer 32 while the output of multiplier 28 is connecting to a noninverting input of summer 32. The resulting summed output provides the demodulated FM MPX signal which is provided to the stereo detector and decoder block.

The detector shown in FIG. 2 comprises a half-complex detector. In accordance with the present invention, the detector can be generalized to have a complex output as well as complex input, thus making it a full-complex detector. The additional output of the full-complex detector is used as a noise detector. When the complex IF signal into the detector is a perfect FM signal (i.e., there is no noise, multipath, or other distortion), then the additional output is zero. When the complex IF signal is not a perfect FM (or phase modulated) signal, then the additional output is non-zero. Furthermore, it has a power level which increases as the quality of the complex IF signal goes down. Thus, a quality indicator is provided which is based on the full IF bandwidth of the IF signal at the detector input. Therefore, increased accuracy of noise detection is obtained.

The mathematical derivation for the prior art half-complex detector was based on calculating the arc tangent of the complex signal A(t), where $$A(t) = I(t) + jQ(t) \quad \text{(Equation 1)}$$

and where the signal is normalized so that $I^2(t) + Q^2(t) = 1$. Calculating the arc tangent gives a demodulated information signal S(t) as follows:

$$S(t) = I(t)\frac{dQ(t)}{dt} - Q(t)\frac{dI(t)}{dt}. \quad \text{(Equation 2)}$$

Thus, the information signal is easy to demodulate as shown in FIG. 2.

The present invention takes advantage of additional information present in the complex signal in the form of a quality measure that is obtained by using a full-complex detector for demodulating the complex IF signal. In deriving a formula for full-complex detection, a term B(t) is defined as the complex conjugate of the first differential of A(t) as follows:

$$B(t) = \left[\frac{dA(t)}{dt}\right]^* \quad \text{(Equation 3)}$$

$$B(t) = \left[\frac{dI(t)}{dt} + j\frac{dQ(t)}{dt}\right]^* = \frac{dI(t)}{dt} - j\frac{dQ(t)}{dt} \quad \text{(Equation 4)}$$

The full complex result Y(t) is obtained as the product of A(t) and B(t):

$$Y(t) = A(t) \cdot B(t) = (I(t) + jQ(t)) \cdot \left(\frac{dI(t)}{dt} - j\frac{dQ(t)}{dt}\right) \quad \text{(Equation 5)}$$

Multiplying and then rearranging into in-phase (real) and quadrature-phase (imaginary) parts results in:

$$Y(t) = \left(I(t)\frac{dI(t)}{dt} + Q(t)\frac{dQ(t)}{dt}\right) + j\left(I(t)\frac{dQ(t)}{dt} - Q(t)\frac{dI(t)}{dt}\right). \quad \text{(Equation 6)}$$

The quadrature-phase part Im[Y(t)] corresponds to the desired phase or frequency detected information and the in-phase part Re[Y(t)] corresponds to a noise signal N(t), where $$N(t) = I(t)\frac{dI(t)}{dt} + Q(t)\frac{dQ(t)}{dt}. \quad \text{(Equation 7)}$$

If the complex signal A(t) contains only frequency modulation, then N(t) will be zero. Any added noise will cause A(t) to deviate from a perfect modulation signal, and N(t) becomes non-zero. In the case of phase modulation, it may be desirable to integrate the quantity of Equation 7 for an accurate noise signal.

Figure 3:
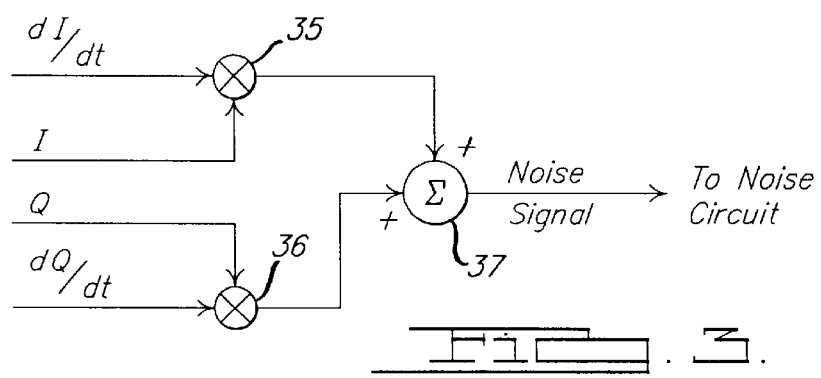
FIG. 3 is a block diagram showing additional processing to derive a noise signal in a full-complex detector.

A preferred embodiment of the new portion of the full-complex detector to implement Equation 7 is shown in FIG. 3. The differentiated I component dI/dt from FIR filter 25 is connected to one input of a multiplier 35. The delayed I signal is coupled to a second input of multiplier 35. The differentiated Q component dQ/dt is coupled to one input of a multiplier 36 and the delayed Q signal is coupled to a second input of multiplier 36. The products of the multipliers are coupled to non-inverting inputs of a summer 37 which provides a noise signal indicative of the quality of the FM signal received. The noise signal is coupled to noise circuits to modify the reproduced information to reduce or eliminate the effects of the noise.

Figure 4:
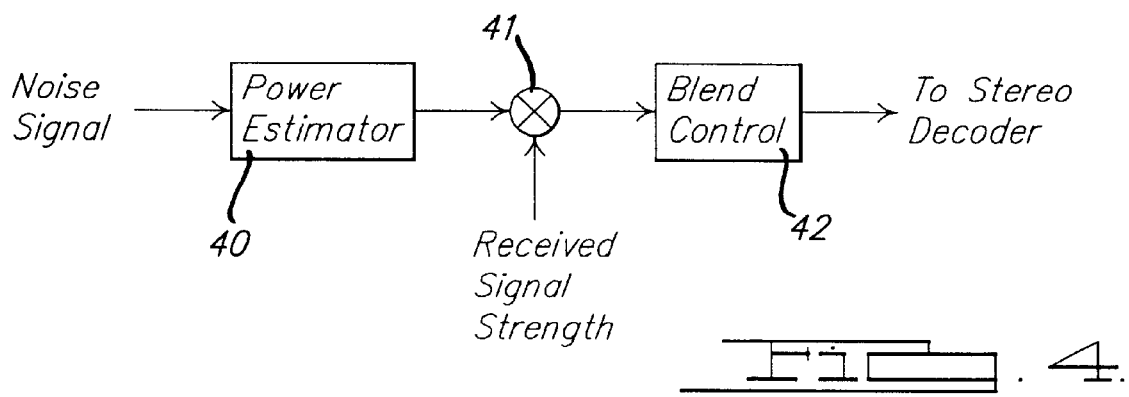
FIG. 4 is a block diagram showing means for controlling stereo separation in response to the noise signal.
Figure 5:
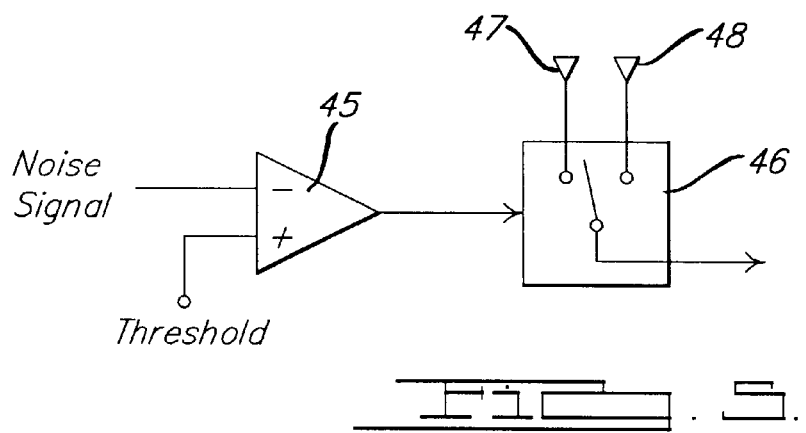
FIG. 5 is a block diagram showing means for controlling a diversity receiver in response to the noise signal.

As shown in FIG. 4, the power of the noise signal is determined in a power estimator 40 (which may consist of a squaring circuit followed by a lowpass filter) and the power signal is then scaled in a multiplier 41 according to the received signal strength (i.e., the noise signal is normalized with respect to the magnitude of the detected FM signal). The normalized signal is input to a blend control 42 for controlling stereo separation in a conventional manner.

In another embodiment, the noise signal is coupled to a comparator 45 for controlling switching of diversity antennas. Thus, the noise signal (which may again be short-term averaged) is coupled to an inverting input of comparator 45. A predetermined noise threshold voltage is coupled to the non-inverting input of comparator 45. When the noise signal exceeds the threshold, then a signal is sent to a diversity switch 46 which is connected to a pair of antennas 47 and 48. In response to the signal from comparator 45, diversity switch 46 toggles to the opposite antenna. Thus, when the noise level received at a particular antenna increases to an undesirable level, the receiver switches to the other antenna in search of better reception quality.

Other corrective actions can be taken in the present invention in response to the noise signal such as modifying the bandwidth of channel filtering of the IF signal or the audio signal in proportion to the noise power detected, or blanking the audio output or the IF signal during periods of excessive noise.

With further processing of the noise signal, it may be possible to measure instantaneous noise and then remove some or all of the instantaneous noise to improve the signal-to-noise ratio of the received signal.

What is claimed is:

1. A method of determining signal quality in a communications receiver, comprising the steps of:

obtaining a complex modulated signal including an in-phase modulated signal I(t) and a quadrature-phase modulated signal Q(t); and demodulating said in-phase modulated signal and said quadrature-phase modulated signal using a full complex detector to generate a in-phase demodulated signal and a quadrature-phase demodulated signal, wherein said in-phase demodulated signal includes noise, and wherein a power level of said in-phase demodulated signal provides a measure of noise in said quadrature-phase demodulated signal.

2. The method of claim 1 wherein said complex modulated signal is obtained by converting a non-complex modulated transmission signal into complex form.

3. The method of claim 1 further comprising the step of:
modifying reproduction of said quadrature-phase demodulated signal in response to said in-phase demodulated signal.

4. The method of claim 1 wherein said quadrature-phase demodulated signal is formed according to the formula $$I(t) \cdot \frac{dQ(t)}{dt} - Q(t) \cdot \frac{dI(t)}{dt},$$

and wherein said in-phase demodulated signal is formed according to the formula $$I(t) \cdot \frac{dQ(t)}{dt} + Q(t) \cdot \frac{dI(t)}{dt}.$$

5. Apparatus for processing a modulated signal comprising;
- a complex mixer for converting said modulated signal into a complex modulated signal including an in-phase modulated signal I(t) and a quadrature-phase modulated signal Q (t);
- a full complex detector demodulating said in-phase modulated signal and said quadrature-phase modulated signal to generate a in-phase demodulated signal and an quadrature-phase demodulated signal;
- a reproduction circuit receiving said quadrature-phase demodulated signal for reproducing information contained in said modulated signal; and
- a noise circuit coupled to said full complex detector and said reproduction circuit, said noise circuit modifying said reproduced information in response to said in-phase demodulated signal.

6. An FM receiver comprising:
- an intermediate frequency stage for providing an intermediate frequency (IF) signal including a frequency modulated information signal;
- a complex mixer coupled to said intermediate frequency stage and generating an in-phase modulated signal I(t) and a quadrature-phase modulated signal Q(t);
- a full complex detector demodulating said in-phase modulated signal and said quadrature-phase modulated signal to generate an in-phase demodulated signal and a quadrature-phase demodulated signal;
- an audio processor receiving said quadrature-phase demodulated signal for controlling reproduction of said frequency modulated information signal; and
- a noise reduction circuit receiving said in-phase demodulated signal and coupled to said audio processor for modifying said reproduction of said frequency modulated information signal in response to said in-phase demodulated signal.

7. The FM receiver of claim 6 wherein said noise reduction circuit adjusts a parameter of said reproduction in accordance with a magnitude of said in-phase demodulated signal.

8. The FM receiver of claim 7 wherein said magnitude of said in-phase demodulated signal is normalized with respect to a magnitude of said quadrature-phase demodulated signal.

9. The FM receiver of claim 7 wherein said parameter is comprised of stereo blend.

10. The FM receiver of claim 7 wherein said parameter is comprised of a selection between diversity antennas.

11. The FM receiver of claim 7 wherein said parameter is comprised of an adjustable audio bandwidth.

12. The FM receiver of claim 6 wherein said full complex detector forms said quadrature-phase demodulated signal according to the formula $$I(t) \cdot \frac{dQ(t)}{dt} - Q(t) \cdot \frac{dI(t)}{dt},$$

and forms said in-phase demodulated signal according to the formula $$I(t) \cdot \frac{dQ(t)}{dt} + Q(t) \cdot \frac{dI(t)}{dt}.$$

* * * * *